US012754841B2

(12) United States Patent
Chung et al.

(10) Patent No.: US 12,754,841 B2
(45) Date of Patent: Oct. 6, 2026

(54) METHOD FOR GENERATING TRAINING DATA FOR CACHE MEMORY DESIGN BASED ON ARTIFICIAL INTELLIGENCE AND SYSTEM USING SAME

(71) Applicant: UIF (University Industry Foundation), Yonsei University, Seoul (KR)

(72) Inventors: Eui-Young Chung, Seoul (KR); Do Hyeon Kim, Seoul (KR); Min Jung Cho, Seoul (KR); Sang Hyup Lee, Seoul (KR); Seong Jae Eom, Seoul (KR); Sung Jin Ahn, Seoul (KR)

(73) Assignee: UIF (University Industry Foundation), Yonsei University, Seoul (KR)

( * ) Notice: Subject to any disclaimer, the term of this patent is extended or adjusted under 35 U.S.C. 154(b) by 0 days.

(21) Appl. No.: 18/966,363

(22) Filed: Dec. 3, 2024

(65) Prior Publication Data

US 2025/0190346 A1 Jun. 12, 2025

(30) Foreign Application Priority Data

Dec. 12, 2023 (KR) ........................ 10-2023-0179295

(51) Int. Cl.
*G06F 12/0802* (2016.01)

(52) U.S. Cl.
CPC ................................ *G06F 12/0802* (2013.01)

(58) Field of Classification Search
CPC .. G06F 12/0802; G06F 3/061; G06F 12/0875; G06F 12/0868
USPC .................................................. 711/118, 154
See application file for complete search history.

(56) References Cited

U.S. PATENT DOCUMENTS

| | | | |
|---|---|---|---|
| 10,268,600 B2 | 4/2019 | Gaur et al. | |
| 2019/0361808 A1* | 11/2019 | Subramanian ...... | G06F 12/0802 |
| 2020/0151510 A1* | 5/2020 | Vishnu ................ | G06F 18/2115 |
| 2021/0264027 A1 | 8/2021 | Venkataramani et al. | |
| 2022/0357888 A1 | 11/2022 | Ballapuram | |

FOREIGN PATENT DOCUMENTS

KR 10-2023-0119894 A 8/2023

OTHER PUBLICATIONS

Xiaoyue Pan et al., 'A Modeling Framework for Reuse Distance-based Estimation of Cache Performance', IEEE, 2015, pp. 62-71.

(Continued)

*Primary Examiner* — Jared I Rutz
*Assistant Examiner* — Edward Waddy, Jr.
(74) *Attorney, Agent, or Firm* — ZION IP; Byungwoong Park

(57) ABSTRACT

Proposed is a method for generating training data for training an artificial intelligence model capable of automatically designing a cache memory structure. The method for generating training data for cache memory design includes setting a reuse profile, setting a first selection reuse distance based on the reuse profile, setting a first load index and a first real reuse distance based on the first selection reuse distance, modifying the reuse profile according to setting the first real reuse distance, and setting a second selection reuse distance based on the modified reuse profile.

11 Claims, 15 Drawing Sheets

(56) References Cited

OTHER PUBLICATIONS

Pascal Hennen, "On the Relation between Stack Histograms and Reuse Histograms", Mar. 29, 2021.
Request for the Submission of an Opinion of KIPO (Office Action), issued on May 18, 2026.

* cited by examiner

FIG. 4

| # | 1 | 2 | 3 | 4 | 5 | 6 | 7 | 8 | 9 |
|---|---|---|---|---|---|---|---|---|---|
| address | a | b | c | a | a | c | b | d | a |
| Reuse distance | -1 or ∞ | -1 or ∞ | -1 or ∞ | 2 | 0 | 1 | 2 | -1 or ∞ | 3 |

| rd | # of rd | Ratio |
|---|---|---|
| 0 | 1 | 0.111.. |
| 1 | 0 | 0 |
| 2 | 2 | 0.222 |
| 3 | 1 | 0.111 |
| 4 | 1 | 0.111 |
| ∞ | 4 | 0.444 |

FIG. 8

| rd | rp |
| --- | --- |
| 24 | 0.299598 |
| 49 | 0.04102 |
| 74 | 0.235282 |
| 99 | 0.110353 |
| 124 | 0.095317 |
| -1 | 0.218429 |

n=5, b=25

N=5

MAXRD =125

| rd | rp |
|---|---|
| 24 | 0.320808 |
| 49 | 0.157959 |
| 74 | 0.201881 |
| 99 | 0.213985 |
| 124 | 0.024391 |
| -1 | 0.080976 |

FIG. 12

| rd | rp | Access # (L=100) |
| --- | --- | --- |
| 0 | 0.1 | 10 |
| 2 | 0.2 | 20 |
| 4 | 0.3 | 30 |
| 8 | 0.3 | 30 |
| -1 | 0.1 | 10 |

11 12 13 14

| long idx | 0 | 1 | 2 | 3 | 4 | 5 | 6 | 7 | 8 | 9 | 10 | 11 | 12 | 13 | 14 | ··· | L-1 |
| --- | --- | --- | --- | --- | --- | --- | --- | --- | --- | --- | --- | --- | --- | --- | --- | --- | --- |
| pick rd | 4 | | | | | | 2 | 4 | 8 | | | | 0 | 0 | 2 | ··· | 8 |
| Load idx | 40 | 16 | 25 | 19 | 38 | 40 | 19 | 16 | 29 | 50 | 45 | 25 | 25 | 25 | 50 | ··· | 12 |
| Real rd | -1 | -1 | -1 | -1 | -1 | 4 | 2 | 4 | -1 | -1 | -1 | 8 | 0 | 0 | 2 | ··· | 8 |

21 31 26 23 22 32 24 33 25

Update rp

| rd | rp | rp0 | rp1 | rp2 | rp3 | rp4 | rp5 | rp6 | rp7 | rp8 | rp9 | rp10 | rp11 | rp12 | rp13 | rp14 | ··· | rp(L-1) |
| --- | --- | --- | --- | --- | --- | --- | --- | --- | --- | --- | --- | --- | --- | --- | --- | --- | --- | --- |
| 0 | 0.1 | 0.101 | 0.102 | 0.103 | 0.104 | 0.105 | 0.106 | 0.108 | 0.109 | 0.110 | 0.111 | 0.112 | 0.114 | 0.103 | 0.093 | 0.094 | ··· | 0 |
| 2 | 0.2 | 0.202 | 0.204 | 0.206 | 0.208 | 0.211 | 0.213 | 0.204 | 0.207 | 0.209 | 0.211 | 0.213 | 0.216 | 0.218 | 0.221 | 0.212 | ··· | 0 |
| 4 | 0.3 | 0.303 | 0.306 | 0.309 | 0.313 | 0.316 | 0.309 | 0.312 | 0.304 | 0.308 | 0.311 | 0.315 | 0.318 | 0.322 | 0.326 | 0.329 | ··· | 0 |
| 8 | 0.3 | 0.303 | 0.306 | 0.309 | 0.313 | 0.316 | 0.319 | 0.323 | 0.326 | 0.330 | 0.333 | 0.337 | 0.330 | 0.333 | 0.337 | 0.341 | ··· | 1 |
| -1 | 0.1 | 0.091 | 0.082 | 0.072 | 0.063 | 0.053 | 0.053 | 0.054 | 0.054 | 0.044 | 0.033 | 0.022 | 0.023 | 0.023 | 0.023 | 0.024 | ··· | 0 |
| rd | Num | rp0 | rp1 | rp2 | rp3 | rp4 | rp5 | rp6 | rp7 | rp8 | rp9 | rp10 | rp11 | rp12 | rp13 | rp14 | ··· | rp(L-1) |
| 0 | 10 | 10 | 10 | 10 | 10 | 10 | 10 | 10 | 10 | 10 | 10 | 10 | 10 | 9 | 8 | 8 | ··· | 0 |
| 2 | 20 | 20 | 20 | 20 | 20 | 20 | 20 | 19 | 19 | 19 | 19 | 19 | 19 | 19 | 19 | 18 | ··· | 0 |
| 4 | 30 | 30 | 30 | 30 | 30 | 30 | 29 | 29 | 28 | 28 | 28 | 28 | 28 | 28 | 28 | 28 | ··· | 0 |
| 8 | 30 | 30 | 30 | 30 | 30 | 30 | 30 | 30 | 30 | 30 | 30 | 30 | 29 | 29 | 29 | 29 | ··· | 1 |
| -1 | 10 | 9 | 8 | 7 | 6 | 5 | 5 | 5 | 5 | 4 | 3 | 2 | 2 | 2 | 2 | 2 | ··· | 0 |

FIG. 14

| rd | rp | num |
|---|---|---|
| 30 | 0.004967 | 3 |
| 47 | 0.076159 | 46 |
| 82 | 0.036424 | 22 |
| 119 | 0.092715 | 56 |
| 123 | 0.115894 | 70 |
| -1 | 0.673841 | 407 |

Hit_rate = 0.326159

METHOD FOR GENERATING TRAINING DATA FOR CACHE MEMORY DESIGN BASED ON ARTIFICIAL INTELLIGENCE AND SYSTEM USING SAME

CROSS REFERENCE TO RELATED APPLICATION

The present application claims priority to Korean Patent Application No. 10-2023-0179295, filed on Dec. 12, 2023, the entire contents of which are incorporated herein for all purposes by this reference.

STATEMENT REGARDING GOVERNMENT SPONSORED RESEARCH OR DEVELOPMENT

This present disclosure is derived from research conducted as part of the SW Computing Industry Core Technology Development of the Ministry of Science and ICT (Project Unique Number: 1711193834, Project Serial Number: 2021-0-00754-003, Project Management Agency: National IT Industry Promotion Agency, Research Project Name: Artificial Intelligence Semiconductor Design SW (Software) Development, Project Execution Agency Name: Korea Advanced Institute of Science and Technology, Research Period: 2023.01.01~2023.12.31), supported by the Ministry of Trade, Industry and Energy of the Republic of Korea.

Meanwhile, in all the aspects of the inventive concept, there is no property interest in the government of the Republic of Korea.

BACKGROUND

Technical Field

The present disclosure relates to a method for generating training data and, more particularly, to a method for generating training data for training an artificial intelligence model capable of automatically designing a cache memory structure.

Description of the Related Art

Automating designs of cache memory structures is necessary for various reasons. First, it is a difficult task to manually design an appropriate cache memory structure due to complex hardware components and diverse application requirements. It is necessary to consider a number of variables and constraints, and many experiments are required to obtain optimal performance.

In addition, new architectures and memory hierarchy structures continuously emerge as technology evolves. In response, by using automated tools, it is possible to respond to the latest technologies and shorten the cycles of development and design.

Automated design of cache memory structures can be efficiently performed by utilizing machine learning and optimization algorithms. Through this, it is possible to automatically find and adjust memory structures optimized for specific applications or tasks. This can contribute to improving performance and energy efficiency, and to relieving developers of the burden of finding the optimal memory structure one by one.

SUMMARY

A task of the present disclosure relates to a method for generating training data for a cache memory design.

In a method for generating training data for cache memory design performed by at least one processor, the method for generating training data for cache memory design according to an exemplary embodiment includes setting a reuse profile, setting a first selection reuse distance based on the reuse profile, setting a first load index and a first real reuse distance based on the first selection reuse distance, modifying the reuse profile according to setting the first real reuse distance, and setting a second selection reuse distance based on the modified reuse profile.

Herein, the setting the reuse profile may include setting the number of reuse distances and a minimum reuse distance, setting a first reuse distance and a second reuse distance based on a preset mathematical formula, the number of reuse distances and the minimum reuse distance, and setting a first probability for the first reuse distance and a second probability for the second reuse distance.

Herein, the first probability and the second probability may be set based on random number generation, and a sum of probabilities corresponding to each reuse distance included in the reuse profile may be "1".

Herein, the setting the reuse profile may include setting the number of reuse distances and a maximum reuse distance, setting a plurality of reuse distances corresponding to the number of reuse distances within a numerical value range of the maximum reuse distance by using a random function, and setting a probability for each of the plurality of reuse distances by using the random function.

Herein, the setting the first load index and the first real reuse distance may include checking whether the first selection reuse distance has ever been used, setting a default value as the first real reuse distance when the first selection reuse distance has never been used, and setting the first load index corresponding to the first real reuse distance by using a numerical value within a range of an index.

Herein, setting a second real reuse distance having the same numerical value as the first selection reuse distance after setting the first real reuse distance may be included, wherein the number of real reuse distances present between the first real reuse distance and the second real reuse distance may be the same as the numerical value of the first selection reuse distance.

Herein, setting a second load index corresponding to the second real reuse distance may be further included, wherein the second load index may have the same numerical value as the first load index.

Herein, further included may be setting the second selection reuse distance based on the modified reuse profile after setting the second real reuse distance, determining whether the number of non-duplicated numerical values from the second load index to a third load index is the same as a value obtained by adding "1" to a numerical value of the second selection reuse distance, the number of hops between the second load index and the third load index being the same as the numerical value of the second selection reuse distance, and setting a fourth load index corresponding to the second selection reuse distance to be the same as the third load index when a result of the determination is positive.

Herein, further included may be setting the second selection reuse distance based on the modified reuse profile after setting the second real reuse distance, determining whether the number of non-duplicated numerical values from the second load index to a third load index is the same as a value obtained by adding "1" to a numerical value of the second selection reuse distance, the number of hops between the second load index and the third load index being the same as the numerical value of the second selection reuse distance, setting the default value to a third real reuse distance corresponding to the second selection reuse distance when a result of the determination is negative, and setting a fifth load index corresponding to the third real reuse distance by using a numerical value within a range of the index, the fifth load index being different from the first load index and the second load index.

Herein, the setting the first load index and the first real reuse distance may include checking whether the first selection reuse distance has ever been used, and setting the first load index corresponding to the first selection reuse distance to be the same as a sixth load index when the first selection reuse distance has ever been used, wherein the number of non-duplicated numerical values from the first load index to the sixth load index may be the same as a value obtained by adding "1" to the numerical value of the first selection reuse distance.

Herein, the modifying the reuse profile may include subtracting a numerical value as many as the number of uses of the first real reuse distance from a first access number for the first real reuse distance included in the reuse profile, and modifying a first probability for the first real reuse distance based on the modified first access number.

Herein, a computer program stored in a computer-readable recording medium may be provided in order to execute the method for generating training data for the cache memory design.

A computing device according to an exemplary embodiment may include a memory, and at least one processor connected to the memory and configured to execute at least one computer-readable program included in the memory, wherein the at least one program includes instructions for setting a reuse profile, setting a first selection reuse distance based on the reuse profile, setting a first load index and a first real reuse distance based on the first selection reuse distance, modifying the reuse profile according to setting the first real reuse distance, and setting a second selection reuse distance based on the modified reuse profile.

A system for generating training data for a cache memory design based on artificial intelligence according to an exemplary embodiment includes a training data generation unit for generating training data by using a reuse distance, and a cache structure design unit configured to design a cache structure for an application by using an artificial intelligence model trained based on the training data, wherein the training data generation unit includes a first module for generating the reuse profile, and a second module for setting a first selection reuse distance based on the reuse profile, setting a first load index and a first real reuse distance based on the first selection reuse distance, modifying the reuse profile according to setting the first real reuse distance, and setting a second selection reuse distance based on the modified reuse profile.

A method of generating training data for a cache memory design may be provided according to an exemplary embodiment of the present disclosure.

BRIEF DESCRIPTION OF THE DRAWINGS

FIGS. 3, 4 and 5 are views for explaining a reuse distance and a reuse profile.

FIG. 8 is a view illustrating the method of FIG. 7.

FIG. 12 is a view illustrating the method of FIG. 11.

FIG. 14 is a view illustrating a result data from training data for cache memory design.

DETAILED DESCRIPTION OF THE DISCLOSURE

Figure 1:
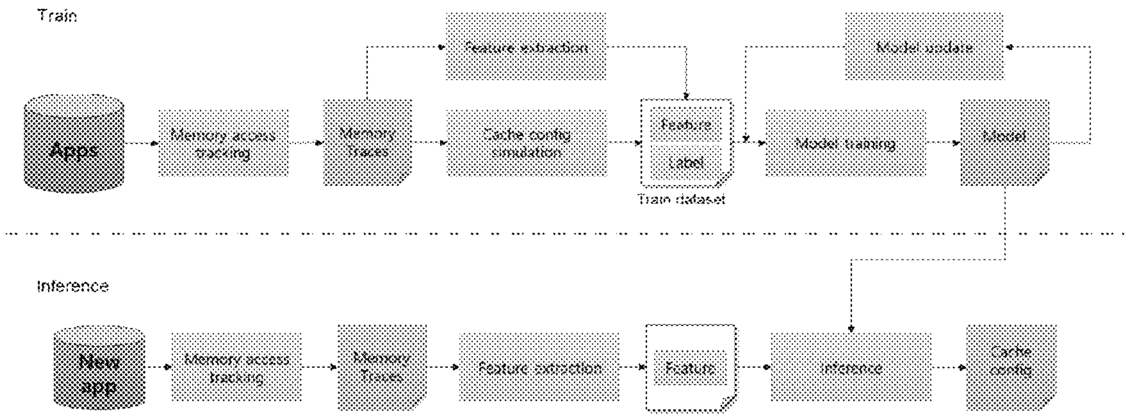
FIG. 1 Prior Art
FIG. 1 is a view illustrating a conventional system for cache memory design based on artificial intelligence.

The exemplary embodiments described in the present specification are intended to clearly explain the idea of the present disclosure to those skilled in the art to which the present disclosure belongs, so the present disclosure is not limited to the exemplary embodiments described in the present specification, and the scope of the present disclosure should be interpreted as including modifications or variations that do not depart from the spirit of the present disclosure.

The terms used in this specification are selected as general terms currently widely used as possible in consideration of the functions of the present disclosure, but this may vary depending on the intention of a person with ordinary knowledge in the technical field to which the present disclosure belongs, precedents, or the emergence of new technologies. However, when a specific term is defined and used in an arbitrary meaning, the meaning of the term will be described separately. Therefore, the terms used in the present specification should be interpreted based on the practical meaning of the term and the overall contents of the present specification, not just the name of the term.

The drawings attached to the present specification are intended to facilitate the description of the present disclosure, and the shape shown in the drawings may be exaggerated and displayed as necessary to help understanding of the present disclosure, and thus the present disclosure is not limited by the drawings.

In the present specification, when it is determined that a detailed description of a known configuration or function related to the present disclosure may obscure the gist of the present disclosure, a detailed description thereof will be omitted as necessary.

FIG. 1 is a view illustrating a conventional system for cache memory design based on artificial intelligence.

Referring to FIG. 1, a conventional system for cache memory design based on artificial intelligence may include a training part and an inference part. The training part may include a memory access tracking module, a memory trace module, a feature extraction module, a simulation module (cache config simulation), a training dataset, and an artificial intelligence model.

Specifically, the memory trace module may extract a memory trace of an application in the AI accelerator. The feature extraction module may extract data locality features from the memory trace extracted by the memory trace module. The simulation module may measure the performance of various cache structures for labeling training dataset and perform labeling. The model training unit may train the artificial intelligence model with the configured training dataset. Accordingly, the inference part may include a module capable of automatically designing a cache memory structure by using the trained artificial intelligence model.

However, the conventional system for cache memory design based on artificial intelligence may have the following problems by directly extracting features from an application. First, the training model may utilize a lot of information related to input data, but this may lead to a data overfitting problem where the model fits too excessively into the training data.

In addition, the model may be more likely to learn features that are specific to a particular task or application, so the ability to generalize the training model may decrease, and the performance for other applications may be degraded in the inference process. In addition, feature extraction may be a time-consuming and expensive process, so there may be a disadvantage of consuming a lot of time and money since the amount of memory traces in an application is huge.

Accordingly, the present disclosure proposes a method for generating training data for training an artificial intelligence model by introducing a trace generator without directly extracting features from an application.

Figure 2:
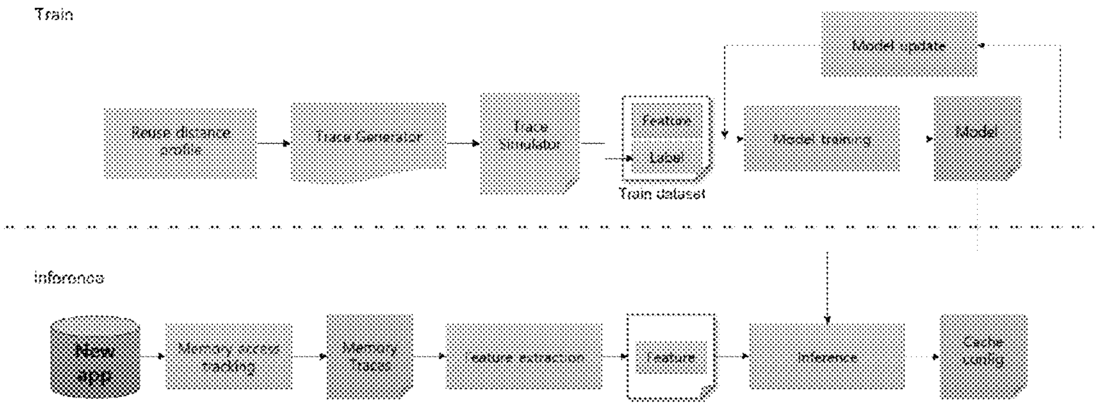
FIG. 2 is a view illustrating a system for cache memory design based on artificial intelligence according to an exemplary embodiment of the present disclosure.

FIG. 2 is a view illustrating a system for cache memory design based on artificial intelligence according to an exemplary embodiment of the present disclosure.

Referring to FIG. 2, the system for cache memory design based on artificial intelligence according to an exemplary embodiment may include a training part and an inference part as shown in FIG. 1. Unlike the conventional one, the training part may include a training data generation unit. Specifically, the training data generation unit may include a first module (a reuse distance profile) for generating a reuse profile and a second module (a trace generator & trace simulator). FIG. 2 may show that the trace generator and the trace simulator are separated from each other, but without being limited thereto, the functions of two components may be performed in one module.

The first module may generate a reuse profile. The second module may set a first selection reuse distance based on the reuse profile, set a first load index and a first real reuse distance based on the first selection reuse distance, modify the reuse profile according to setting the first real reuse distance, and set a second selection reuse distance based on the modified reuse profile.

The training of the artificial intelligence model may be performed by using the training data generated based on the first module and the second module. The trained artificial intelligence model may design a cache memory structure in the inference part.

The present disclosure may generate training data for a cache memory design based on a reuse distance. Hereinafter, a reuse distance will be described.

Figure 3:
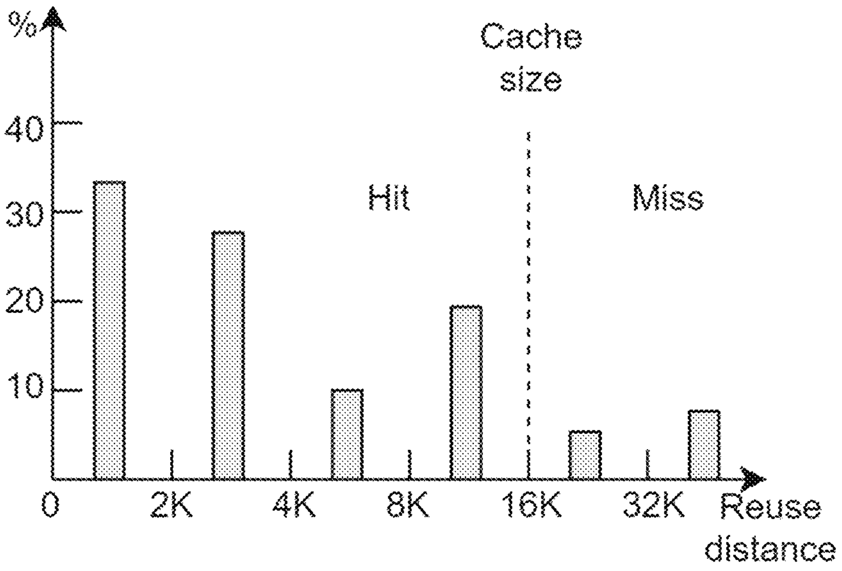
Figure 5:
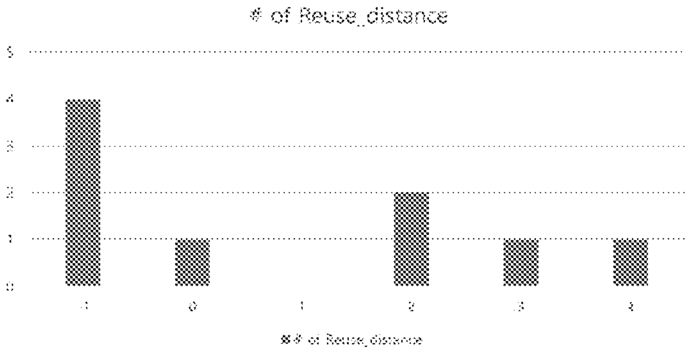

FIGS. 3 to 5 are views for explaining a reuse distance and a reuse profile.

FIG. 3 is a view illustrating temporal locality. Referring to FIG. 3, a reuse distance may be an indicator closely related to the temporal locality of data.

In order to efficiently utilize the cache, the hit rate of the cache should be maximized. As shown in FIG. 3, the hit rate of the cache may be determined by a hit when the reuse distance is smaller than the cache size and by a miss when the reuse distance is larger than the cache size.

The cache may have a limited size, so when accessing a memory address that does not exist in the cache, the cache may fetch data from the main memory to the cache. In this case, the cache may erase as much data from the cache as fetching from the main memory, and may update the data to the main memory. There may be a number of cache replacement policies, including LRUs, FIFOs, and RRs, which are methods for determining which data the cache erases and updates, and the reuse distance may be one of the main indicators. Accordingly, a reuse distance analysis may be used as one of the best ways for characterizing the memory operation of an application, which enables optimizing the cache.

FIG. 4 is a view illustrating a reuse distance.

Referring to FIG. 4, it may be understood that the reuse distance is an indicator that quantifies the locality of a memory access pattern. Specifically, the reuse distance may represent the number of accesses to a unique or non-duplicated address between two accesses when the same data is accessed. In this case, the reuse distance of the memory address that is accessed for the first time may be expressed as "−1" or infinity, and when the same data is consecutively accessed, the reuse distance may become "0". In addition, in this case, the reuse distance of the memory address that is accessed for the first time may be set to a default value ("−1" or infinity).

Specifically, referring to FIG. 4, first, when the first address is "a", "a" may be the first accessed memory address, so the first reuse distance may become "−1" or infinite (hereinafter, the following explanation excludes the case where it is infinity). When the second address is "b" and the third address is "c", the second and third reuse distances may be "−1" since "b" and "c" are the first accessed memory addresses.

When the fourth address is "a", "a" has been accessed before, so it may be necessary to check the number of accesses of unique (non-duplicated) addresses between the first address and the fourth address. Since the number of accesses of unique addresses between the first address and the fourth address is "2" ("b" and "c"), the fourth reuse distance may become "2".

When the fifth address is "a", "a" has been accessed before, so it may be necessary to check the number of accesses of unique addresses between the fifth address and the fourth address ("a" accessed just before). Since the number of accesses of unique addresses between the fifth address and the fourth address may be "0", the fifth reuse distance may become "0".

When the sixth address is "c", "c" has been accessed before, so it may be necessary to check the number of accesses of unique addresses between the sixth address and the third address ("c" accessed just before). Since the number of accesses of unique addresses between the sixth address and the third address is "1" ("a"), the sixth reuse distance may become "1".

When the seventh address is "b", "b" has been accessed before, so it may be necessary to check the number of accesses of unique addresses between the seventh address and the second address ("b" accessed just before). Since the number of accesses of unique addresses between the seventh address and the second address is "2" ("a" and "c"), the seventh reuse distance may become "2".

When the eighth address is "d", the eighth reuse distance may become "−1" since "d" is the memory address that has been accessed for the first time.

When the ninth address is "a", "a" has been accessed before, it may be necessary to check the number of accesses of unique addresses between the ninth address and the fifth address ("a" accessed just before). Since the number of accesses of unique addresses between the ninth address and the fifth address is "3" ("b", "c", "d"), the ninth reuse distance may become "3".

As described above, the reuse distance may be determined based on the number of accesses of unique addresses between accessed addresses, thereby becoming an indicator representing the locality of the memory access patterns.

FIG. 5 is a view illustrating a reuse profile for a reuse distance.

Referring to FIG. 5, the reuse profile may include information on the number of reuse distances and the probability for each reuse distance. As an example of FIG. 5, the number of reuse distances may be "6", and the reuse distances may be "−1" (default), "0", "1", "2", "3", and "4", respectively. Referring to the table of FIG. 5, the number of reuse distances for each reuse distance and a probability (ratio) calculated based thereon may be identified.

The reuse profile may include information on the number of accesses (appearances) of the reuse distance set for each reuse distance. In addition, the reuse profile may include information on a probability based on the number of accesses of the reuse distance. In this case, a sum of probabilities for each reuse distance may be "1". The number of accesses of the reuse distance may be randomly set, and may be set based on a predetermined equation. The present disclosure may generate a variety of training data by controlling the number of accesses of the reuse distance, the number of reuse distances, and the numerical value of the reuse distance.

Figure 6:
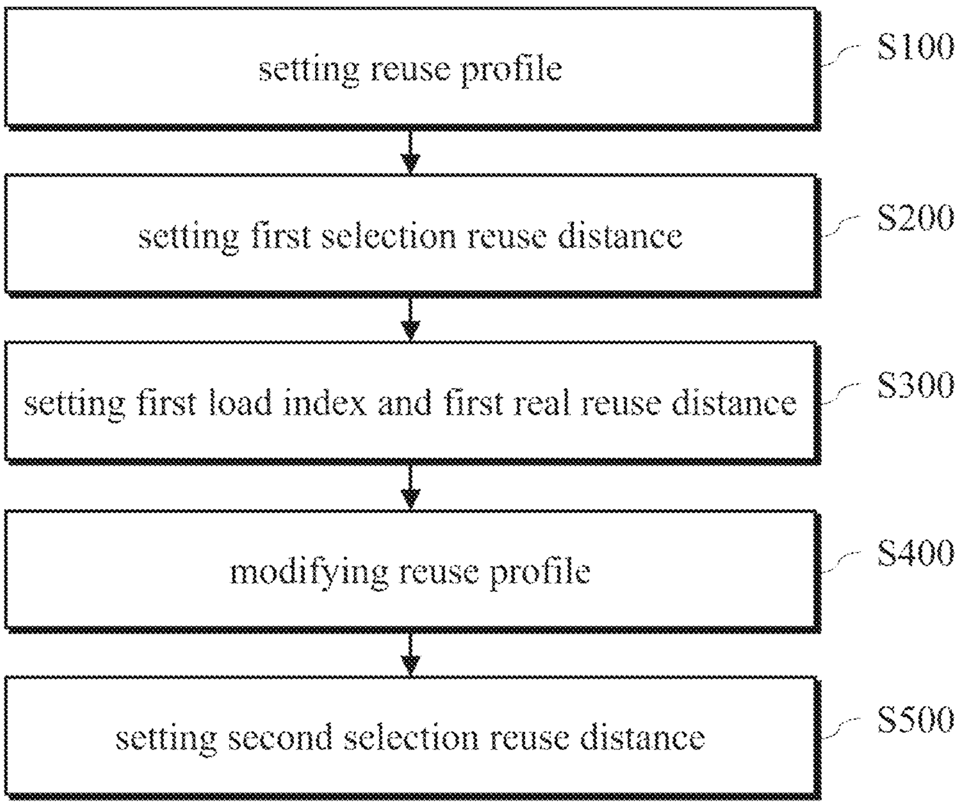
FIG. 6 is a flowchart of a method for generating training data for a cache memory design according to an exemplary embodiment.

FIG. 6 is a flowchart of a method for generating training data for a cache memory design according to an exemplary embodiment.

Referring to FIG. 6, a method for generating training data for a cache memory design according to an exemplary embodiment may include setting a reuse profile (S100), setting a first selection reuse distance (S200), setting a first load index and a first real reuse distance (S300), modifying the reuse profile (S400), and setting a second selection reuse distance (S500). FIG. 6 may show that the steps S100 to S500 are sequentially performed, but without being limited to thereto, some steps may be merged and performed simultaneously, some steps may be omitted, or new steps may be added.

The setting the reuse profile (S100) may be generating the reuse profile as shown in FIG. 5. There may be various methods of setting the reuse profile. Hereinafter, the method of setting the reuse profile will be described in detail with reference to FIGS. 7 to 10.

Figure 7:
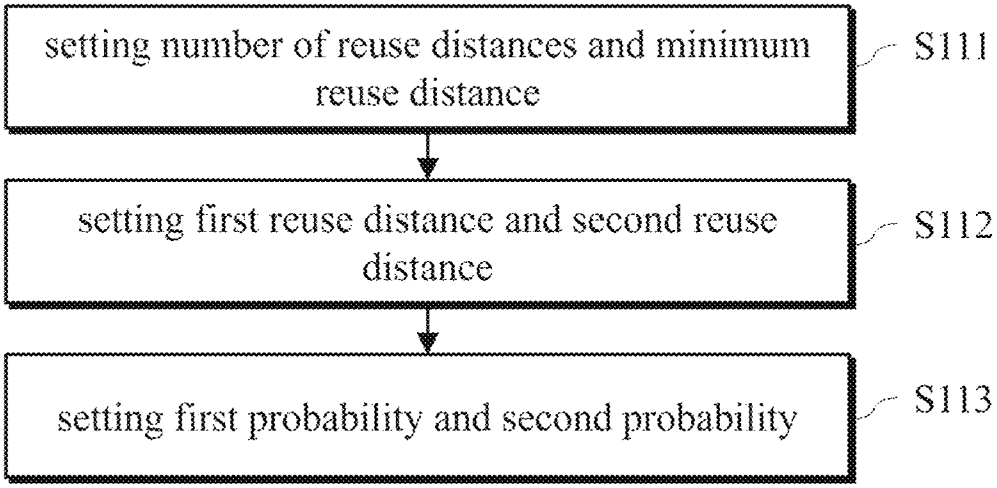
FIG. 7 is a flowchart of a method for setting a reuse profile according to an exemplary embodiment.

FIG. 7 is a flowchart of a method for setting a reuse profile according to an exemplary embodiment. FIG. 8 is a view illustrating the method of FIG. 7.

Referring to FIG. 7, the setting the reuse profile according to an exemplary embodiment may include setting the number of reuse distances and a minimum reuse distance (S111), setting a first reuse distance and a second reuse distance (S112), and setting a first probability and a second probability (S113). FIG. 7 may show that the steps S111 to S113 are sequentially performed, but without being limited to thereto, some steps may be merged and performed simultaneously, some steps may be omitted, or new steps may be added.

The setting the number of reuse distances and the minimum reuse distance (S111) may be setting how many reuse distances are to be included and used in the reuse profile and the minimum of the numerical value (a numerical value excluding the default value of "−1") of the reuse distance value. Referring to FIG. 8, it may be seen that the number (n) of reuse distances is "5" and the minimum of the numerical value (b) of reuse distances is set to "25" in the example of FIG. 8.

The setting the first reuse distance and the second reuse distance (S112) may be setting the first reuse distance and the second reuse distance based on a preset mathematical formula. In the example of FIG. 8, the reuse distance may be set by using the mathematical formula of m*b-1 ("m" is a natural number). For a specific example, when "m" is "1", the first reuse distance of "24" may be set by using b-1.

In addition, for example, when "m" is "2", the second reuse distance of "49" may be set by using 2b-1. In addition, for example, when "m" is "3", the third reuse distance of "74" may be set by using 3b-1. By repeating this, the reuse distance may be set until the number of reuse distances excluding the default value ("−1") becomes "n".

The setting the first probability and the second probability (S113) may be setting the number of accesses (appearances) of reuse distances for the reuse distance set in the step S112 and the probability based on thereon. In the example of FIG. 8, it may be seen that the first probability for the first reuse distance ("24") is set to "0.299598", and the second probability for the second reuse distance ("49") is set to "0.04102". In this way, the probabilities for the reuse distances may be set such that the total sum of the probabilities for the number of "n" reuse distances becomes "1".

Figure 9:
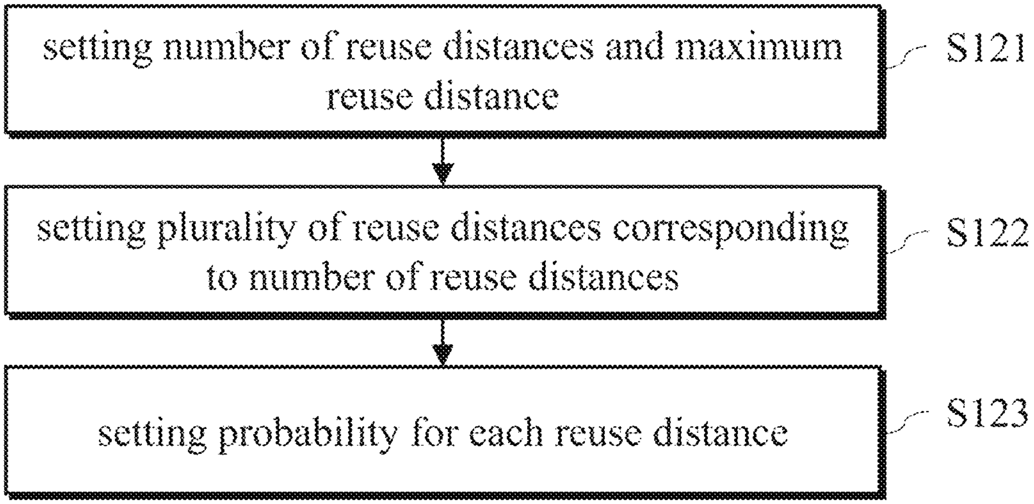
FIG. 9 is a flowchart of a method for setting a reuse profile according to another exemplary embodiment.
Figure 10:
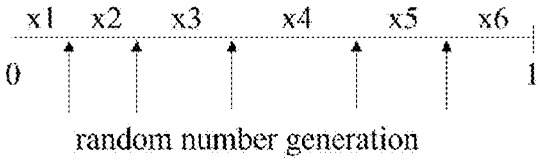
FIG. 10 is a view illustrating the method of FIG. 9.

FIG. 9 is a flowchart of a method for setting a reuse profile according to another exemplary embodiment. FIG. 10 is a view illustrating the method of FIG. 9.

Referring to FIG. 9, the method for setting the reuse profile according to another exemplary embodiment may include setting the number of reuse distances and a maximum reuse distance (S121), setting a plurality of reuse distances corresponding to the number of reuse distances (S122), and setting a probability for each reuse distance (S123). FIG. 9 may show that the steps S121 to S123 are sequentially performed, but without being limited to thereto, some steps may be merged and performed simultaneously, some steps may be omitted, or new steps may be added.

The setting the number of reuse distances and the maximum reuse distance (S121) may be setting how many reuse distances are to be included and used in the reuse profile and the maximum of the numerical value (a numerical value excluding the default value of "−1") of the reuse distance value. Referring to FIG. 10, it may be seen that the number (n) of reuse distances is "5", and the maximum (MAXRD) of the numerical value of reuse distances is set to "125" in the example of FIG. 10.

The setting the plurality of reuse distances corresponding to the number of reuse distances (S122) may be setting a plurality of reuse distances corresponding to the number of reuse distances within a numerical range of the maximum reuse distance by using a random function. Referring to FIG. 10, it may be seen that the number of "n" (the number of "5") numerical values of reuse distances are set between "0" and "125".

The setting the probability for each reuse distances (S123) may be setting the probability for each of the plurality of reuse distances by using a random function. Referring to FIG. 10, it may be seen that a processor included in the system generates six random numbers (x1 to x6) between "0" and "1" by using a random number generation function.

The processor may set the generated random number as a probability for each reuse distance.

Referring back to FIG. 6, the setting the first selection reuse distance (S200) may be setting the first selection reuse distance based on the reuse profile generated in the step S100. The selection reuse distance may be one of indicators for generating a memory address that becomes training data. By setting the selection reuse distance, a load index may be set, and a real reuse distance may be set according to the load index.

The setting the first load index and the first real reuse distance (S300) may be setting the first load index and the first real reuse distance corresponding to the first selection reuse distance based on the first selection reuse distance set in the step S200.

The modifying the reuse profile (S400) may be modifying the reuse profile generated in the step S100 in consideration of the parameters set in the steps S200 and S300. Specifically, the step S400 may be modifying an access number for the reuse distance and a probability.

The setting the second selection reuse distance (S500) may be setting the selection reuse distance as in the step S200 by the reuse profile modified in the step S400.

The steps S200 to S500 will be described in detail below with reference to the flowchart of FIG. 11 and the example of FIG. 12.

Figure 11:
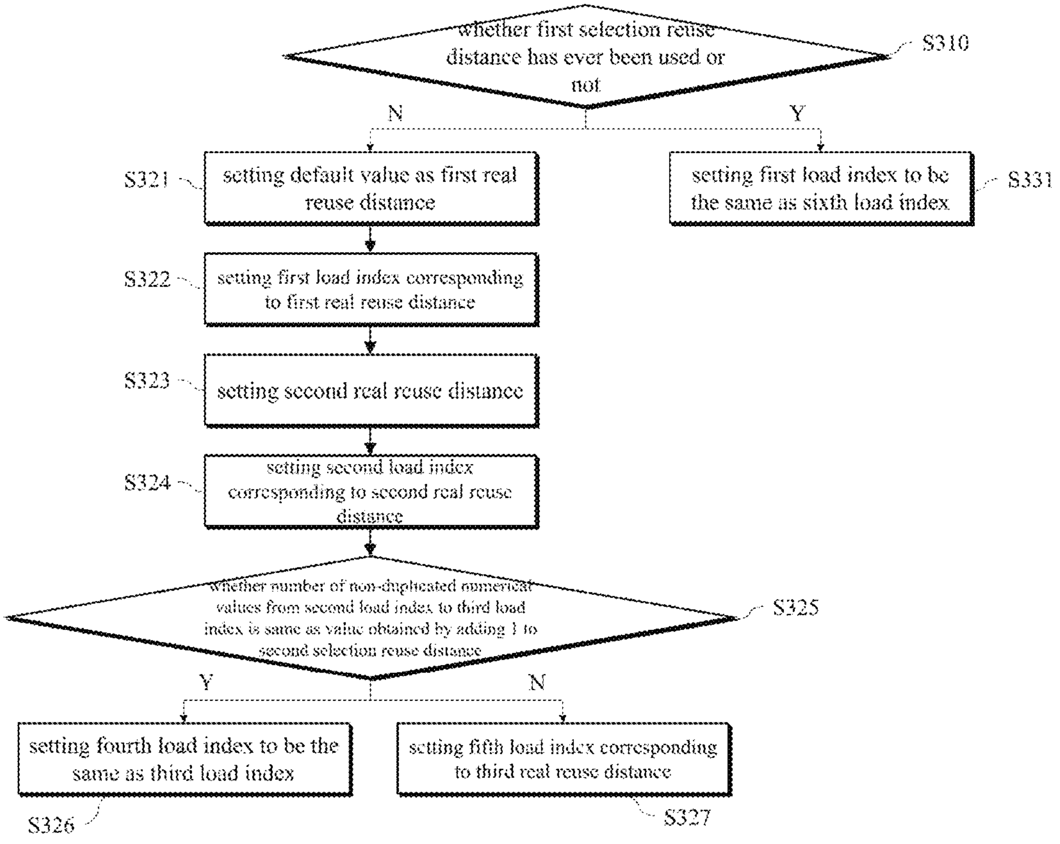
FIG. 11 is a flowchart of a method for setting a first load index and a first real reuse distance according to an exemplary embodiment.

FIG. 11 is a flowchart of a method for setting a first load index and a first real reuse distance according to an exemplary embodiment. FIG. 12 is a view illustrating the method of FIG. 11.

Referring to FIG. 11, the method for setting a first load index and a first real reuse distance according to an exemplary embodiment may include determining whether the first selection reuse distance has ever been used (S310). When the result of the step S310 is negative, setting a default value as the first real reuse distance (S321), setting the first load index corresponding to the first real reuse distance (S322), setting the second real reuse distance (S323), and setting the second load index corresponding to the second real reuse distance (S324) may be performed. Alternatively, when the result of the step S310 is positive, setting the first load index to be the same as the sixth load index (S331) may be performed.

After the step S324, determining whether the number of non-duplicated numerical values from the second load index to the third load index is the same as a value obtained by adding "1" to the numerical value of the second selection reuse distance may be performed (S325). When the result of the step S325 is positive, setting the fourth load index to be the same as the third load index may be performed (S326). When the result of the step S325 is negative, setting a fifth load index corresponding to the third real reuse distance may be performed (S327).

The steps S310 to S331 may be written by names such as the first selection reuse distance, the second real reuse distance, and the like, but the first selection reuse distance may become the second selection reuse distance or the third selection reuse distance. That is, the steps of FIG. 11 may be repeatedly performed for each selection reuse distance.

Referring to FIG. 12, the processor may set a selection reuse distance, a load index, and a real reuse distance as many as the predetermined length (L) based on the reuse profile. First, the processor may set the first selection reuse distance 11 based on the reuse profile. In an example of FIG. 12, the processor may set the first selection reuse distance 11 as "4" based on the probability according to each reuse distance included in the reuse profile.

The processor may set the first load index 21 and the first real reuse distance 31 according to the first selection reuse distance. Specifically, the processor may set the first real reuse distance 31 based on whether the first selection reuse distance 11 has ever been used (S310). In the example of FIG. 12, since the first selection reuse distance 11 of "4" has not been used (not accessed before), the processor may set a default value (e.g., "−1") as the first real reuse distance 31 (S321).

The processor may set the first load index 21 corresponding to the first real reuse distance 31. Specifically, the processor may randomly set a numerical value of a first load index 21 according to the first selection reuse distance 11 within a range of a predetermined index (e.g., "0" to "10000"). In the example of FIG. 12, the processor may set the first load index 21 corresponding to the first selection reuse distance 11 to "40".

Thereafter, the processor may set the second real reuse distance 32. The processor may set the numerical value of the second real reuse distance 32 to be the same as the numerical value of the first selection reuse distance 11. In this case, the number of real reuse distances present between the first real reuse distance 31 and the second real reuse distance 32 may be the same as the numerical value of the first selection reuse distance 11. In the example of FIG. 12, the number of real reuse distances present between the first real reuse distance 31 and the second real reuse distance 32 may be the number of "4" "−1"s, and it may be seen that the number thereof may be the same as the first selection reuse distance 11.

The processor may set the second load index 22 corresponding to the second real reuse distance 32. In this case, the second load index 22 may have the same numerical value as the first load index 21. This is because the number of non-duplicated load indices from the first real reuse distance 31 to the second real reuse distance 32 (wherein the first real reuse distance 31 and the second real reuse distance 32 are included) should be the same as the sum of the numerical value of the second real reuse distance 32 and "1". This may be due to the definition of the reuse distance, and the second load index 22 may be automatically set by the definition of the reuse distance since the second real reuse distance 32 is set.

After setting the real reuse distance, the processor may be capable of modifying the reuse profile. This process may be performed whenever the real reuse distance is set.

Figure 13:
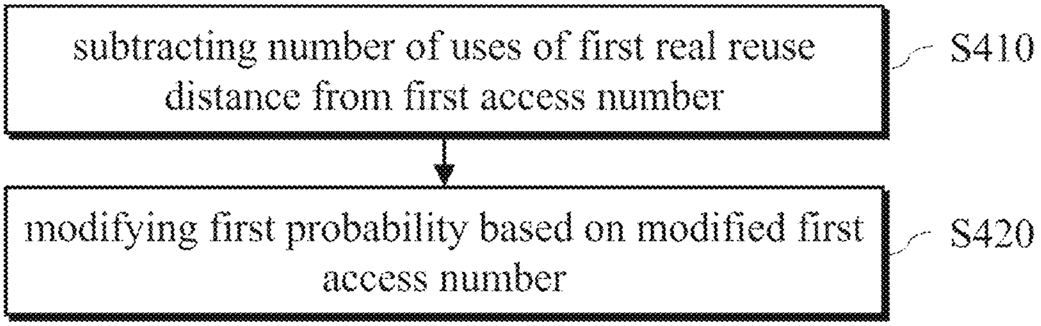
FIG. 13 is a flowchart of a method for modifying a reuse profile according to an exemplary embodiment.

FIG. 13 is a flowchart of a method for modifying a reuse profile according to an exemplary embodiment.

Referring to FIG. 13, the method of modifying the reuse profile according to an exemplary embodiment may include subtracting the number of uses of the first real reuse distance from a first access number (S410) and modifying the first probability based on the modified first access number (S420).

In the example of FIG. 12, since the real reuse distance is set to the default value of "−1" at the 0-th length, the processor may subtract "1", the number of uses of "−1", from the access number (Access #) corresponding to "−1" in the reuse profile. Accordingly, the access number of "−1" may be modified from "10" to "9". After subtracting the number of uses from the access number, the processor may recalculate the probability for each reuse distance based on the modified access number.

In addition, for example, since the real reuse distance is set to "4" at the 5-th length, the processor may subtract "1", the number of uses of "4", from the access number corresponding to "4" in the reuse profile. Accordingly, the access number of "4" may be modified from "30" to "29". After subtracting the number of uses from the access number, the processor may recalculate the probability for each reuse distance based on the modified access number.

Referring back to FIG. 12, after setting the second real reuse distance 32, the processor may set the second selection reuse distance 12 based on the modified reuse profile. In the example of FIG. 12, the processor may set the second selection reuse distance 12 to "2" based on the modified probability.

In order to set a fourth load index corresponding to the second selection reuse distance 12, the processor may check whether the number of non-duplicated numerical values from the second load index 22 to the third load index 23 is the same as the value obtained by adding "1" to the numerical value of the second selection reuse distance 12 (S325). In this case, the third load index 23 may refer to a load index where the second load index 22 and the number of hops are the same as the numerical value of the second selection reuse distance 12.

In the example of FIG. 12, after passing one hop from the second load index 22, the load index at the 4-th length may be "38" and after passing two hops, the load index at the 3-rd length may be "19". In this case, the third load index 23 may be determined to be a load index of "2" where the number of hops is the same as the numerical value of the second selection reuse distance 12. Accordingly, the third load index 23 may be "19", which is the load index at the 3-rd length.

In the example of FIG. 12, it may be seen that the number of non-duplicated numerical values from the second load index 22 to the third load index 23 is in total three of "40", "38", and "19", which is the same as the value obtained by adding "1" to "2", which is the numerical value of the second selection reuse distance 12. Accordingly, the processor may set the fourth load index 24 corresponding to the second selection reuse distance 12 to be the same as "19", which is the numerical value of the third load index 23 (S326).

However, the number of non-duplicated numerical values from the second load index 22 to the third load index 23 may not be the same as the value obtained by adding "1" to the numerical value of the second selection reuse distance 12. This case may be described below with reference to the fourth selection reuse distance 14.

After setting the fourth load index 24, the processor may set the third selection reuse distance 13 based on the modified reuse profile. In the example of FIG. 12, the processor may set the numerical value of the third selection reuse distance 13 to "4". Returning to the step S310 of FIG. 11, the processor may check whether the third selection reuse distance 13 has ever been used.

Since "4" at the 0-th length has ever been used as the first selection reuse distance 11, the processor may set a load index corresponding to the third selection reuse distance 13 by performing the step S331. Accordingly, the processor may determine the numerical value of the load index corresponding to the third selection reuse distance 13 as "16" and determine the real reuse distance as "4", such that the number of non-duplicated numerical values between load indices becomes "5" ("4"+"1").

Thereafter, the processor may set the fourth selection reuse distance 14 based on the modified reuse profile. In the example of FIG. 12, the processor may set the numerical value of the fourth selection reuse distance 14 to "8". Returning to the step S310 of FIG. 11, the processor may check whether the fourth selection reuse distance 14 has ever been used.

Since the numerical value "8" has never been used, the processor may set the third real reuse distance corresponding to the fourth selection reuse distance 14 to the default value of "−1". In addition, the processor may perform the step S325 for the fourth selection reuse distance 14. In the example of FIG. 12, the processor may confirm that the result of the step S325 for the fourth selection reuse distance 14 is negative. Accordingly, by performing the step S327, the processor may randomly set the fifth load index 25 (e.g., "29") corresponding to the fourth selection reuse distance 14 within a numerical value range of the index.

FIG. 14 is a view illustrating a result data from training data for cache memory design.

Referring to FIG. 14, the processor may generate a reuse profile by setting the probability (rp) and access number (num) of each reuse distance with respect to a case where the number of reuse distances is the number of "5" (excluding the default value of "−1"). The processor may execute a trace simulation as shown in FIG. 12 by using the reuse profile. As a result of the trace simulation, a trace including the set load indices may be generated. The processor may calculate a hit rate based on the generated trace. Accordingly, an artificial intelligence model may be trained based on training data including a calculated trace (address) and hit rate. The trained artificial intelligence model may design a cache memory structure for an application in an inference part.

Figure 15:
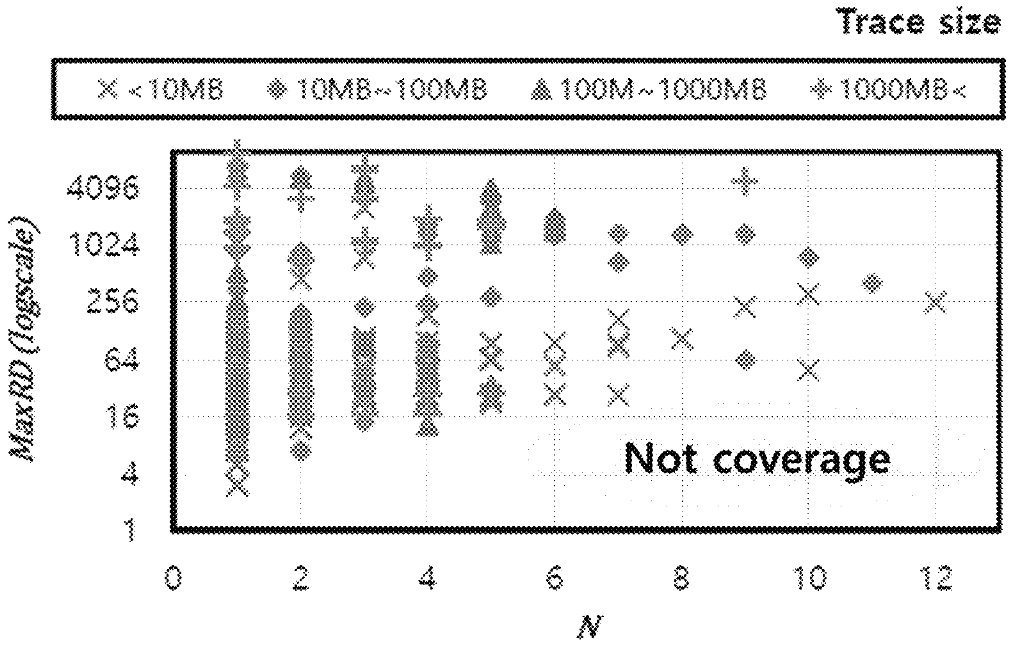
FIG. 15 is a view illustrating effects derived from a system for cache memory design based on artificial intelligence according to the present disclosure.

FIG. 15 is a view illustrating effects derived from a system for cache memory design based on artificial intelligence according to the present disclosure.

Referring to FIG. 15, in the conventional technology, there may be a coverage space on the graph of the reuse distance according to the access number even when the access number (N) and the reuse distance (RD) are variously adjusted. The wider the coverage space, the more inefficient the system may be due to underutilization of resources.

On the other hand, the present disclosure may ensure that the entire area is used evenly without the coverage area by setting the access number (N) and the maximum reuse distance (RD) as shown in FIG. 15. Accordingly, the present disclosure may be utilized to passively adjust training data according to a required coverage space.

The method according to an exemplary embodiment may be implemented in the form of program commands that may be executed through various computer means and recorded on a computer-readable medium. The computer-readable medium may include program commands, data files, data structures, and the like alone or in combination. Program commands recorded on the medium may be specially designed and configured for exemplary embodiments, or may be known and available to those skilled in computer software. Examples of computer-readable recording media may include magnetic media such as hard disks, floppy disks and magnetic tapes, optical media such as CD-ROMs and DVDs, magnetic-optical media such as floptical disks, and hardware devices specifically configured to store and perform program commands such as ROMs, RAMs, and flash memories. Examples of program commands may be not only machine language codes such as those produced by a compiler, but also high-level language codes that are executed by a computer using an interpreter or the like. The hardware device described above may be configured to operate as one or more software modules in order to perform the operations of the exemplary embodiments, and vice versa.

As described above, the exemplary embodiments have been described by limited exemplary embodiments and drawings, but various modifications and variations from the above description may be possible to those of ordinary skill in the art. For example, appropriate results may be achieved even when the described techniques are performed in a different order from the described method, and/or the described components such as systems, structures, devices, circuits, etc. may be combined or assembled in a different form from the described method, or may be replaced or substituted by other components or equivalents.

Therefore, other implementations, other exemplary embodiments, and those equivalent to the patent claims may fall within the scope of the claims described below.

What is claimed is:

1. A method for generating training data for a cache memory design performed by at least one processor, the method comprising:

setting a reuse profile;

setting a first selection reuse distance based on the reuse profile;

setting a first load index and a first real reuse distance based on the first selection reuse distance;

modifying the reuse profile according to setting the first real reuse distance; and setting a second selection reuse distance based on the modified reuse profile, wherein the reuse profile includes a plurality of reuse distances, each of the plurality of reuse distances represents a number of accesses to a non-duplicated address during two times of accesses of a duplicated address, which indicates a locality of access patterns to the cache memory for determining an optimized cache replacement policy how an old data is erased from the cache memory as the cache memory fetching a new data from a main memory, the setting the reuse profile comprises:

setting a number of reuse distances and a minimum reuse distance;

setting a first reuse distance and a second reuse distance based on a preset mathematical formula, the number of the reuse distances, and the minimum reuse distance; and setting a first probability for the first reuse distance and a second probability for the second reuse distance, the modifying the reuse profile comprises:

subtracting a numerical value as many as a number of uses of the first real reuse distance from a first access number for the first real reuse distance included in the reuse profile; and modifying the first probability for the first real reuse distance based on the modified first access number, and the reuse profile is repeatedly modified by the at least one processor whenever the at least one processor sets a real reuse distance which includes, at least, the first real reuse distance.

2. The method of claim 1, wherein the first probability and the second probability are set based on random number generation, and a sum of probabilities corresponding to each reuse distance included in the reuse profile is “1”.

3. The method of claim 1, wherein the setting the reuse profile further comprises:

setting a number of reuse distances and a maximum reuse distance;

setting the plurality of reuse distances corresponding to the number of the reuse distances within a numerical value range of the maximum reuse distance by using a random function; and setting a probability for each of the plurality of reuse distances by using the random function.

4. The method of claim 1, wherein the setting the first load index and the first real reuse distance comprises:

checking whether the first selection reuse distance has ever been used;

setting a default value as the first real reuse distance in response to determining that the first selection reuse distance has never been used; and setting the first load index corresponding to the first real reuse distance by using a numerical value within a range of an index.

5. The method of claim 4, further comprising:

setting a second real reuse distance having the same numerical value as the first selection reuse distance after setting the first real reuse distance, wherein a number of real reuse distances present between the first real reuse distance and the second real reuse distance is the same as the numerical value of the first selection reuse distance.

6. The method of claim 5, further comprising:

setting a second load index corresponding to the second real reuse distance, wherein the second load index has the same numerical value as the first load index.

7. The method of claim 6, further comprising:

setting the second selection reuse distance based on the modified reuse profile after setting the second real reuse distance;

determining whether a number of non-duplicated numerical values from the second load index to a third load index is the same as a value obtained by adding “1” to a numerical value of the second selection reuse distance, a number of hops between the second load index and the third load index being the same as a numerical value of the second selection reuse distance; and setting a fourth load index corresponding to the second selection reuse distance to be the same as the third load index in response to determining a result of the determination is positive.

8. The method of claim 6, further comprising:

setting the second selection reuse distance based on the modified reuse profile after setting the second real reuse distance;

determining whether a number of non-duplicated numerical values from the second load index to a third load index is the same as a value obtained by adding “1” to a numerical value of the second selection reuse distance, a number of hops between the second load index and the third load index being the same as a numerical value of the second selection reuse distance;

setting the default value to a third real reuse distance corresponding to the second selection reuse distance in response to determining a result of the determination is negative; and setting a fifth load index corresponding to the third real reuse distance by using a numerical value within a range of the index, the fifth load index being different from the first load index and the second load index.

9. The method of claim 1, wherein the setting the first load index and the first real reuse distance comprises:

checking whether the first selection reuse distance has ever been used; and setting the first load index corresponding to the first selection reuse distance to be the same as a sixth load index in response to determining that the first selection reuse distance has ever been used, wherein a number of non-duplicated numerical values from the first load index to the sixth load index is the same as a value obtained by adding "1" to a numerical value of the first selection reuse distance.

10. A computing device, the device comprising:

a memory; and at least one processor connected to the memory and configured to execute at least one computer-readable program included in the memory, wherein the at least one program comprises instructions for setting a reuse profile, setting a first selection reuse distance based on the reuse profile, setting a first load index and a first real reuse distance based on the first selection reuse distance, modifying the reuse profile according to setting the first real reuse distance, and setting a second selection reuse distance based on the modified reuse profile, wherein the reuse profile includes a plurality of reuse distances, each of the plurality of reuse distances represents a number of accesses to a non-duplicated address during two times of accesses of a duplicated address, which indicates a locality of access patterns to the cache memory for determining an optimized cache replacement policy how an old data is erased from the cache memory as the cache memory fetching a new data from a main memory, the setting the reuse profile comprises:

setting a number of reuse distances and a minimum reuse distance;

setting a first reuse distance and a second reuse distance based on a preset mathematical formula, the number of the reuse distances, and the minimum reuse distance; and setting a first probability for the first reuse distance and a second probability for the second reuse distance, the modifying the reuse profile comprises:

subtracting a numerical value as many as a number of uses of the first real reuse distance from a first access number for the first real reuse distance included in the reuse profile; and modifying the first probability for the first real reuse distance based on the modified first access number, and the reuse profile is repeatedly modified by the at least one processor whenever the at least one processor sets a real reuse distance which includes, at least, the first real reuse distance.

11. A system for a cache memory design based on artificial intelligence, the system comprising:

a training data generation unit for generating training data by using a reuse distance; and a cache structure design unit configured to design a cache structure for an application by using an artificial intelligence model trained based on the training data, wherein the training data generation unit comprises:

a first module for generating the reuse profile; and a second module for setting a first selection reuse distance based on the reuse profile, setting a first load index and a first real reuse distance based on the first selection reuse distance, modifying the reuse profile according to setting the first real reuse distance, and setting a second selection reuse distance based on the modified reuse profile, wherein the reuse profile includes a plurality of reuse distances, each of the plurality of reuse distances represents a number of accesses to a non-duplicated address during two times of accesses of a duplicated address, which indicates a locality of access patterns to the cache memory for determining an optimized cache replacement policy how an old data is erased from the cache memory as the cache memory fetching a new data from a main memory, the setting the reuse profile comprises:

setting a number of reuse distances and a minimum reuse distance;

setting a first reuse distance and a second reuse distance based on a preset mathematical formula, the number of the reuse distances, and the minimum reuse distance; and setting a first probability for the first reuse distance and a second probability for the second reuse distance, the modifying the reuse profile comprises:

subtracting a numerical value as many as a number of uses of the first real reuse distance from a first access number for the first real reuse distance included in the reuse profile; and modifying the first probability for the first real reuse distance based on the modified first access number, and the reuse profile is repeatedly modified by the at least one processor whenever the at least one processor sets a real reuse distance which includes, at least, the first real reuse distance.

* * * * *